(No Model.)

E. P. KENDALL.
NUT LOCK.

No. 523,531. Patented July 24, 1894.

Witnesses
J. W. Reynolds
Chas. S. Ayer.

Inventor
Elton P. Kendall
By John Wedderburn
Attorney

UNITED STATES PATENT OFFICE.

ELTON P. KENDALL, OF FAIRLEE, ASSIGNOR TO GEORGE A. DICKEY, OF BRADFORD, VERMONT.

NUT-LOCK.

SPECIFICATION forming part of Letters Patent No. 523,531, dated July 24, 1894.

Application filed March 29, 1894. Serial No. 505,629. (No model.)

*To all whom it may concern:*

Be it known that I, ELTON P. KENDALL, a citizen of the United States, and a resident of Fairlee, in the county of Orange and State of Vermont, have invented certain new and useful Improvements in Nut-Locks; and I do hereby declare the following to be a full, clear, and exact description of the invention, such as will enable others skilled in the art to which it appertains to make and use the same.

The present invention has for its object, the provision of a nut lock which will be simple, compact, efficient for the purpose designed, and automatically compensate for wear and expansion.

The improvement consists, essentially, of a nut lock washer having its ends or edge portions bent up approximately at right angles and slightly recurved to retain a key in position between the said bent edge portion and the opposing edge of the nut.

The improvement also consists of a washer of rubber, felt or similar elastic material interposed between the nut lock washer and the part to be clamped, whereby any looseness in the bolt occasioned by wear or expansion will be automatically taken up.

The improvement also further consists in the peculiar construction of the key, which may have approximately the form of an L or U as preferred, and which is designed to be inserted between the bent ends or edges of the nut lock washer and the opposing edges of the nut.

With these ends in view, and such others as appertain to the nature of the invention, the improvement consists in the novel features which hereinafter will be more fully described and claimed, and which are shown.

Figure 1:
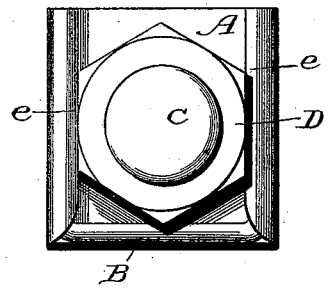
Figure 3:
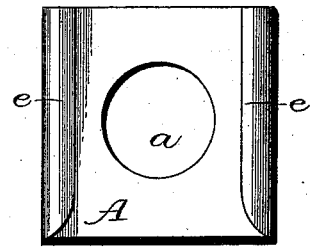
Figure 2:
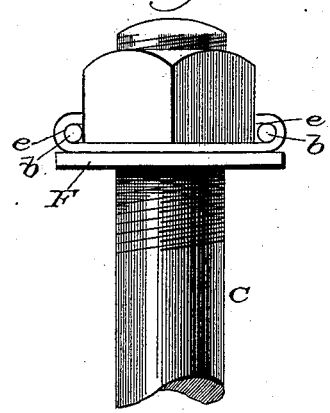
Figure 4:
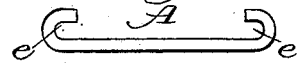
Figure 6:
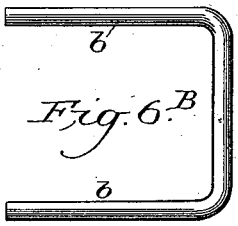
Figure 7:
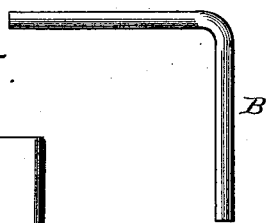
Figure 5:
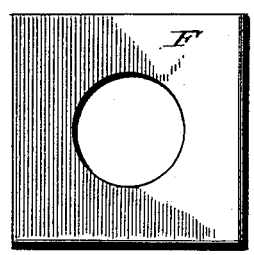

In the accompanying drawings, Figure 1, is a front view of a nut lock washer constructed in accordance with, and embodying the essential features of, the invention. Fig. 2, is a side elevation or top plan view of the device. Fig. 3, is a detailed view of the metal washer. Fig. 4, is an edge view of the washer shown in Fig. 3. Fig. 5, is a detail view of the flexible or elastic washer. Fig. 6, is a detail view of the preferred form of key. Fig. 7, is a modification of the locking key.

Referring to the drawings, the letter C indicates a bolt of ordinary construction, threaded at one end, and adapted to receive a nut D of usual formation, and which may be hexagonal or of any other preferred form in its general outline.

The nut lock washer A, is approximately of a rectangular shape, and is provided with a central opening $a$, to receive the bolt C, and with bent ends or edge portions $e$, which are designed in the operation of the invention to extend up along the edges of the nut D. The bent edge portions $e$ are slightly recurved to form seats to receive and retain in place the key B by means of which the parts are securely fastened. This washer is preferably constructed of sheet metal about one-sixteenth of an inch thick, and is loosely mounted on the threaded end of the bolt.

The washer F of rubber, felt or similar flexible elastic material approximates the form of the metal washer A and is designed to be placed between the said washer A and the part or structure to which the bolt is applied.

The key B, as shown in Fig. 6, is composed of parallel members $b$, which are connected at one end by a cross bar, and is designed to straddle the nut and have the members $b$ come between the bent ends $e$ of the metal washer A and the opposing edges of the nut D as most clearly shown in Fig. 1. This key is constructed of wire, or a light rod or bar which may have any desired form in cross sectional area, and which is cut in proper length and bent in the form substantially as shown. The key shown in Fig. 7, has only one member which is designed to be used in substantially the same manner as the key shown in Fig. 6 and performing precisely the same office.

In assembling the parts the flexible or elastic washer F is first placed upon the threaded end of the bolt and against the face of the structure to be bolted. The metal washer A is next placed in position and the nut D screwed home in the usual and well known manner. The key is next placed in position, as shown in Figs. 1 and 2, and secures the parts in the located position.

Having thus described the invention, what is claimed as new is—

In a nut and bolt lock, the combination with the bolt and nut, of a washer of flexible material having its opposite edges provided with key seats and constructed of flexible material, said washer being compressed by the said nut against the face of the structure to which the bolt is applied, and the key seats having outer reduced portions to form entrance mouths and having their inwardly extending edges bearing against the nut and a key seated in and held in place by the said key seats and the opposing edges of the nut, substantially as and for the purposes specified.

In testimony whereof I have signed this specification in the presence of two subscribing witnesses.

ELTON P. KENDALL.

Witnesses:
ABBIE B. AVERY,
J. B. W. PRICHARD.